United States Patent
Boero et al.

(10) Patent No.: US 9,874,329 B2
(45) Date of Patent: Jan. 23, 2018

(54) METHOD OF LASER WELDING OF AN AUTOMOTIVE LIGHT AND RELATIVE AUTOMOTIVE LIGHT

(71) Applicant: Automotive Lighting Italia S.p.A. a Socio Unico, Turin (IT)

(72) Inventors: Cristiano Boero, Turin (IT); Domenico Ferigo, Turin (IT); Nicola Schiccheri, Turin (IT); Fabio Leone, Turin (IT); Alessandro Buzzurro, Turin (IT)

(73) Assignee: Automotive Lighting Italia S.p.A. a Socio Unico, Turin (IT)

( * ) Notice: Subject to any disclaimer, the term of this patent is extended or adjusted under 35 U.S.C. 154(b) by 485 days.

(21) Appl. No.: 14/667,854

(22) Filed: Mar. 25, 2015

(65) Prior Publication Data

US 2015/0276159 A1    Oct. 1, 2015

(30) Foreign Application Priority Data

Mar. 28, 2014    (IT) .............................. PD2014A0081

(51) Int. Cl.
*F21S 8/10*     (2006.01)
*B29C 65/16*    (2006.01)
(Continued)

(52) U.S. Cl.
CPC ........ *F21S 48/1208* (2013.01); *B29C 65/169* (2013.01); *B29C 65/1635* (2013.01);
(Continued)

(58) Field of Classification Search
CPC . F21S 48/1208; F21S 48/2206; B29C 66/542; B29C 66/114; B29C 66/1142;
(Continued)

(56) References Cited

U.S. PATENT DOCUMENTS

| 6,592,239 B1 | 7/2003 | Akiyama et al. |
| 2001/0028567 A1 | 10/2001 | Akiyama et al. |

(Continued)

FOREIGN PATENT DOCUMENTS

JP    2001277364 A    10/2001

OTHER PUBLICATIONS

Aug. 1, 2014 European Search Report for Italian Patent Application No. PD20140081.

*Primary Examiner* — David V Bruce
(74) *Attorney, Agent, or Firm* — Howard & Howard Attorneys PLLC

(57) ABSTRACT

A method of manufacturing an automotive light including the steps of: providing a container body delimited by a first perimetral profile; providing a lenticular body delimited by a second perimetral profile; associating the profiles, with a contact surface therebetween defining a welding interface; providing a laser emission device emitting radiation, operatively connected to a first light guide with an output to distribute radiation via a spatial distribution including with lobes; providing a second light guide inside the lenticular body adapted to obtain a light guide of radiation inside the lenticular body, having walls defined by a first lobe; arranging the guides to route a first lobe of radiation from the output towards the second guide, to propagate at least one lobe of radiation inside the second light guide towards the welding interface; wherein the container body acts as an absorbing member and the lenticular body acts as a transmissive member.

22 Claims, 13 Drawing Sheets

(51) Int. Cl.
    *B29C 65/00*    (2006.01)
    *B29L 31/00*    (2006.01)
    *B29K 701/00*   (2006.01)
    *B29L 11/00*    (2006.01)
    *B29L 31/30*    (2006.01)

(52) U.S. Cl.
    CPC ...... *B29C 65/1667* (2013.01); *B29C 65/1687* (2013.01); *B29C 66/114* (2013.01); *B29C 66/1142* (2013.01); *B29C 66/131* (2013.01); *B29C 66/301* (2013.01); *B29C 66/542* (2013.01); *F21S 48/2206* (2013.01); *B29C 65/167* (2013.01); *B29C 65/1654* (2013.01); *B29C 65/1674* (2013.01); *B29C 66/71* (2013.01); *B29K 2701/00* (2013.01); *B29L 2011/00* (2013.01); *B29L 2031/3055* (2013.01); *B29L 2031/747* (2013.01)

(58) Field of Classification Search
    CPC . B29C 66/131; B29C 66/301; B29C 65/1687; B29C 65/169; B29C 65/1635; B29C 65/1667
    See application file for complete search history.

(56) References Cited

U.S. PATENT DOCUMENTS

| | | | |
|---|---|---|---|
| 2001/0028568 A1* | 10/2001 | Akiyama | B29C 66/542 362/520 |
| 2005/0030751 A1 | 2/2005 | Matsunaga et al. | |
| 2011/0203726 A1 | 8/2011 | Zaitsu et al. | |

\* cited by examiner

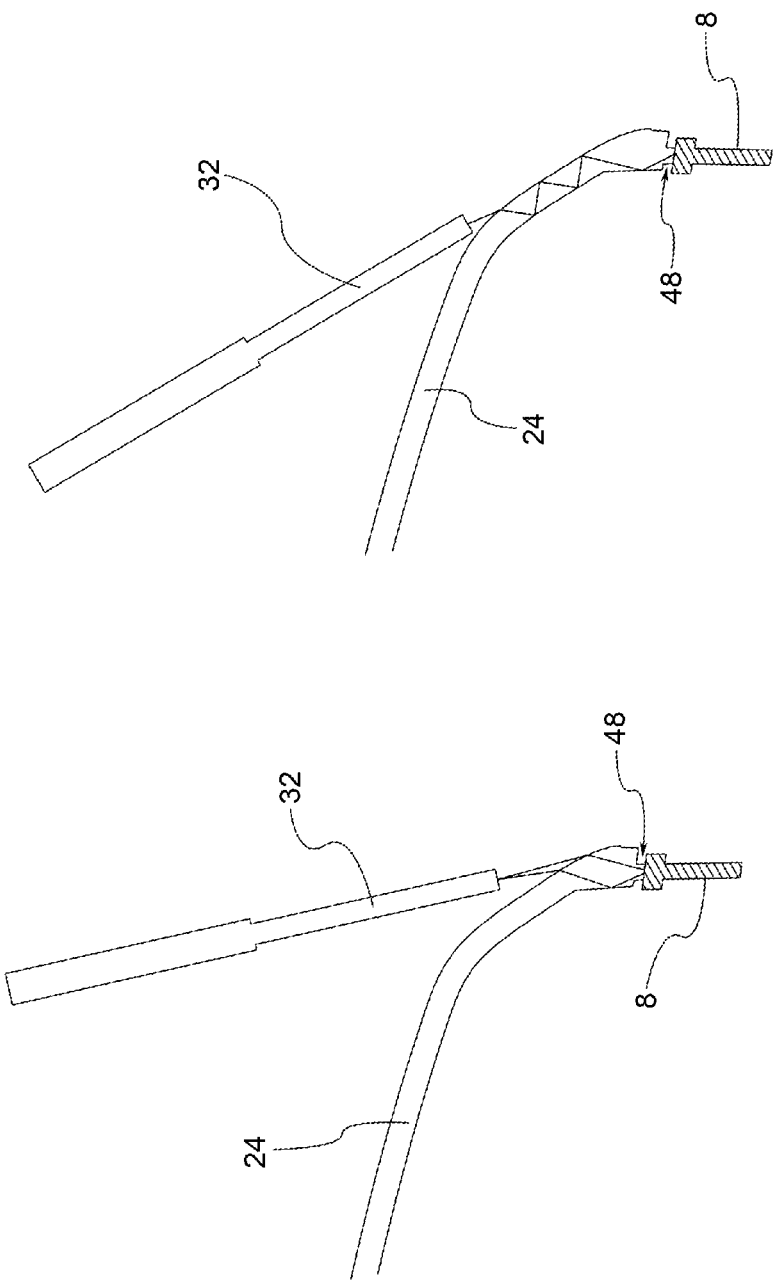

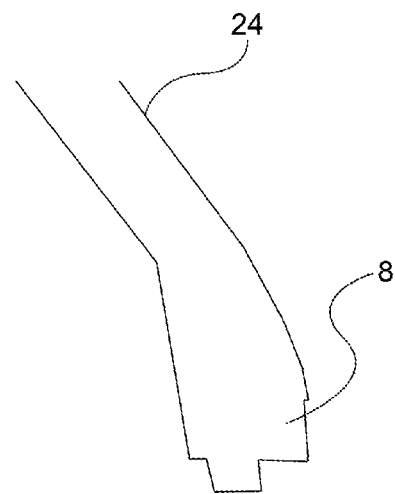
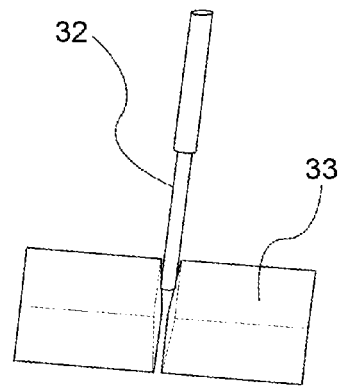
FIG.3  FIG.4
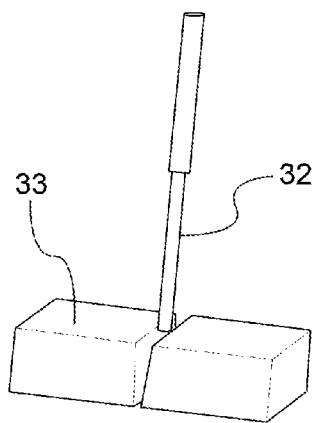
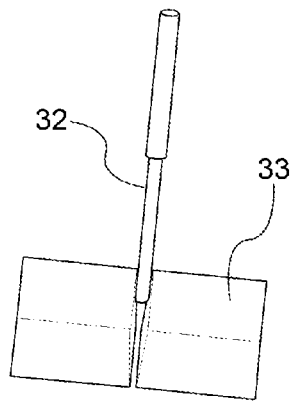
FIG.5  FIG.6

METHOD OF LASER WELDING OF AN AUTOMOTIVE LIGHT AND RELATIVE AUTOMOTIVE LIGHT

CROSS-REFERENCE TO RELATED APPLICATION

This application is based upon and claims priority to Italian Patent Application No. PD2014A000081, filed on Mar. 28, 2014.

BACKGROUND OF THE INVENTION

1. Field of the Invention

The present invention relates, generally, to automotive lights and, more specifically, to an automotive light and a method of laser welding an automotive light.

2. Description of Related Art

The term "automotive light" as used in the related is known to refer to either a rear automotive light or a front automotive light (also known as a "headlight") for use as lighting and/or signaling devices of a vehicle, which includes at least one external automotive light having a lighting and/or signaling function towards the outside of the vehicle (such as, for example: a sidelight, an indicator light, a brake light, a rear fog light, a reverse light, a dipped beam headlight, a main beam headlight, etc.).

The automotive light generally includes a container body, a lenticular body, and at least one light source. The lenticular body is placed so as to close a mouth of the container body so as to form a housing chamber. The light source is arranged inside the housing chamber, which may be directed so as to emit light towards the lenticular body when powered with electricity.

In manufacturing automotive lights, once the various components have been assembled, there needs to be attachment and hermetic sealing of the lenticular body to the container body. Typically, sealing is effected by welding. It will be appreciated that welding may also be utilized for other components of a more complex automotive light, for example components arranged inside the housing chamber.

The process of laser welding of polymeric bodies an automotive light makes it possible to combine a transmissive polymeric body capable of transmitting a laser radiation, and an absorbent polymeric body capable of absorbing the laser radiation. Here, the laser radiation is transformed into heat when it encounters the absorbent polymeric body which, by heating locally, transfers heat to the transmissive polymeric body, resulting in a softening and a local melting of both polymeric bodies which thus join firmly to each other.

By way of example, the absorbent polymeric body of the automotive light may include the container body, while the transmissive polymeric body may include the lenticular body, which closes the container body and forms a housing chamber for housing a light source of the automotive headlight. However, it will be appreciated that the absorbent and transmissive polymeric bodies can be realized generically by further polymeric components of the automotive headlight.

Laser welding processes of polymeric bodies of automotive lights can be difficult to implement because of the complex geometry of the polymeric bodies. For example, surface discontinuities of the transmissive polymeric body (such as fittings, ribs, grooves, prominences, curvatures, etc.) may obstruct the flow of the laser radiation towards the welding area, which is often distant from an emission point of the laser radiation. To overcome drawbacks of this kind, solutions known in the related art include providing a polymeric transmissive portion of the body acting as guide light of the laser radiation as described in U.S. Pat. No. 6,592,239B1; or an apparatus for simultaneous laser welding equipped with a distributor of laser radiation including a light guide formed of flat mirror-treated walls to focus the laser radiation. However, both of these expedients have poor performance, because only a small fraction of the laser radiation emitted by a laser emitter reaches the welding area (See FIGS. 1 and 2).

By way of example of the first solution described above, and with reference to FIGS. 1 and 2, a convex-shaped lenticular body may include a light guide end capable of channeling the laser radiation emitted by the laser towards the welding area, using at least one reflection of the laser radiation on the inner walls of the lenticular body. However, experimental tests have shown that the laser emitter and the light guide end of the lenticular body do not cooperate in a very effective manner since only a small portion of the laser radiation emitted by the laser emitter is channeled towards the welding area; specifically, only a fraction equal to 22% of the laser radiation emitted by the laser emitter reaches the welding area with a single reflection of the laser radiation, while this fraction decreases drastically with a plurality of reflections of the laser radiation, arriving at just 2% of the laser radiation emitted by the laser emitter.

In addition, the use of a portion of the transmissive lenticular body as a light guide proves to be a poor solution also in the case in which the lenticular body has a discontinuous surface. Moreover, the laser radiation may be deflected in an uncontrolled manner by the discontinuity, or the correct inclination of the laser radiation with respect to an input area of the lenticular body may be compromised in order to bypass the discontinuity, with consequent waste of laser radiation.

As an example of the second solution described above, and with reference to FIGS. 3 and 4, simulations of this welding process have shown that the distributor of the laser radiation including a light guide formed of flat mirror-treated walls is not able to directly route the laser radiation emerging from an outlet of the laser radiation distributor towards the welding area in some situations, particularly if the lenticular body is a curved shape. The laser radiation distributor may, in fact, sometimes not find any location close to a face of the lenticular body, because the laser radiation distributor would physically interfere with the lenticular body.

In addition, the use of the laser radiation distributor including mirror-treated flat walls proves an arguable solution even in the case in which the lenticular body presents a surface discontinuity. In fact, a substantial proportion of the laser radiation emerging from the outlet of the laser radiation distributor is deflected in an uncontrolled manner by the surface discontinuity of the lenticular body without reaching the welding area.

Thus, conventional laser welding applications and techniques used with automotive lights are not very efficient because of the complex geometries of automotive lights to be welded. In fact, the lenticular bodies and the container bodies of automotive lights are made of polymeric materials and include highly complex geometries with curved or straight coupling surfaces with highly variable inclinations along the entire perimeter of the mutual coupling. The complex geometry of automotive lights or their components (such as the container body and the lenticular body) are ill-adapted to current laser welding techniques which are in fact optimized for applications on flat walls, simple geometries, and relatively thin thicknesses of the bodies. Thus, laser welding techniques are currently little used on automotive lights in that there is no guarantee of satisfactory results and alternative welding techniques are more cost/time competitive (such as vibration, ultrasound, and friction welding, etc.).

In addition, certain complexities of automotive lights further discourages and makes current laser welding techniques inconvenient. By way of example, a component of the automotive light (such as the lenticular body) can be crossed by light emitted by the light source so as to effect lighting of the automotive light. The lenticular body may have a coloration so as ensure that the color of the light emitted by the light source complies with government-mandated regulations (for example, a stop light of the automotive light may be realised with a substantially white light source and a lenticular body tending to red). However, during the laser welding process, a red colored lenticular body absorbs a lot of light energy in comparison to a clear lenticular body to the detriment of the light energy provided by the laser source, which needs to be able to provide a predetermined light energy in the welding area. The increased absorption due to the presence of a colored lenticular body acting as the transmission element, which filters the radiation emitted, requires the use of higher power laser beams, which consequently results in high energy consumption and increased welding costs. This way, the energy efficiency of the laser welding of lenticular bodies is further reduced: absorbing (inasmuch as colored) a significant portion of light radiation; and dispersing well over half due to the complex geometries of the lenticular bodies themselves.

Because of the foregoing considerations, laser welding techniques are little used on conventional automotive lights since they are too complex, expensive, and inconvenient to implement when compared to alternative welding techniques, such as ultrasonic welding. Thus, there remains a need in the art for a laser welding method of polymeric bodies used in automotive lights able to reduce the power of the laser source.

SUMMARY OF THE INVENTION

The present invention overcomes the disadvantages in the related art in an automotive light and a method of laser welding the automotive light. The method includes the steps of: providing a container body delimited by a first perimetral profile; providing a lenticular body delimited by a second perimetral profile; associating at least partially with each other the respective first and second perimetral profiles of the container body and the lenticular body, with a contact surface between the perimetral profiles defining a welding interface; providing at least one laser emission device emitting a light beam or radiation having a characteristic emission spectrum; wherein the emission device is operatively connected to a first light guide of the emitted light radiation, the first light guide having an input and an output of the light radiation, so as to distribute the radiation from that output according to a spatial distribution including a plurality of portions or lobes; providing a second light guide inside the lenticular body adapted to obtain a light guide of the light radiation inside the lenticular body, wherein the second light guide is provided with walls capable of satisfying an overall internal reflection condition for at least one portion of the laser radiation defined by at least one first lobe or portion; suitably arranging with each other the first and the second light guide so as to route at least a first lobe or portion of the laser radiation coming from the output of the first light guide towards the second light guide of the lenticular body, so as to propagate at least one portion or lobe of the laser radiation inside the second light guide towards the welding interface; wherein the container body acts as an absorbing member in relation to the light beam and the lenticular body acts as a transmissive member of the light beam.

In this way, the automotive light and method of the present invention overcome the technical drawbacks in the related art which otherwise make laser welding of automotive lights inconvenient and expensive. Specifically, the present invention makes it possible to reach the welding area with a portion of laser radiation emitted by a bigger laser emitter compared to prior solutions known in the related art. Moreover, the present invention reduces the power of the laser source for laser welding of polymeric bodies used in automotive lights compared to the prior solutions known in the related art.

BRIEF DESCRIPTION OF THE DRAWINGS

Other objects, features, and advantages of the present invention will be readily appreciated as the same becomes better understood after reading the subsequent description taken in connection with the accompanying drawings wherein:

FIGS. 1-10 show schematic views of welding solutions and methods of the prior art, from time to time referred to in the present description.

DETAILED DESCRIPTION OF THE INVENTION

Figure 7:
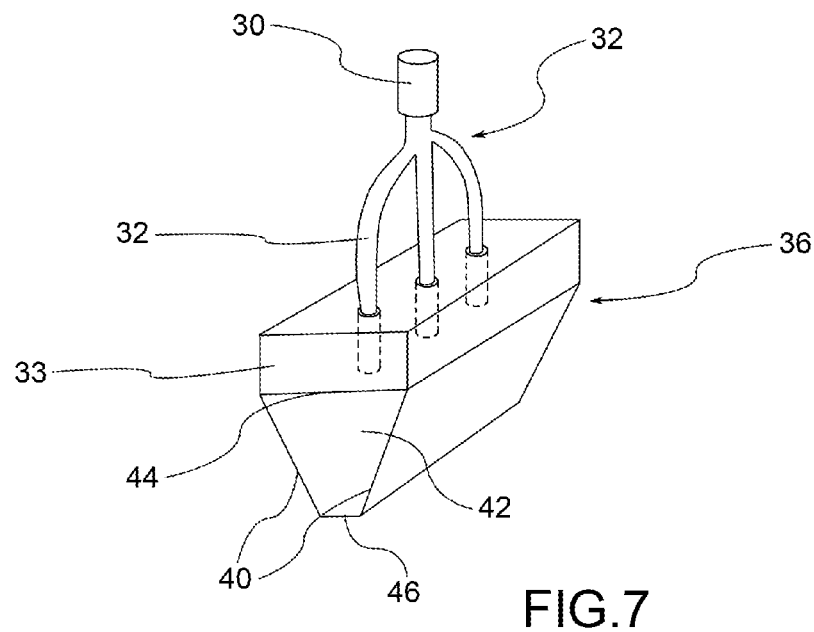

The elements or parts of elements common to the embodiments described below are indicated using the same reference numerals. Referring now to the Figures, an automotive light is generally indicated at 4. It will be appreciated that the automotive light 4 could be a rear automotive light or a front automotive light (also known as a headlight). The automotive light includes at least one outer vehicle light having a lighting and/or signaling function (for example: a front, rear, or lateral sidelight; an indicator light; a brake light; a rear fog light; a dipped beam headlight; a main beam headlight; etc.).

The automotive light 4 includes a container body 8, usually of polymeric material, which typically permits attachment of the automotive light 4 to the vehicle. For the purposes of the present invention, the container body 8 may be any shape and size, and may even be an element inside the automotive light (for example: not directly fixed to or associated with the bodywork or other fastenings of the vehicle).

In one embodiment, the container body 8 delimits a containment housing 12 which houses at least one light source 16, connected to a source of electric power, and adapted to emit a light beam to propagate outside the automotive light. For the purposes of the present invention, the type of light source 16 used is irrelevant. However, the light source 16 may advantageously be a light source of light emitting diodes (LED).

The container body 8 is delimited by a first perimetral profile 20. A lenticular body 24 in turn delimited by a second perimetral profile 28 is joined to the container body 8. For the purposes of the present invention, the lenticular body 24 may be either external to the automotive light 4 so as to define at least one outer wall of the automotive light directly subject to the atmosphere; or the lenticular body may also be internal to the automotive light 4, for example not directly subject to the external atmosphere and in turn covered directly or indirectly by one or more screens or covering panels.

In one embodiment, the lenticular body 24 may be adapted to close the containment housing 12 and to transmit the light beam produced by the light source 16 to the outside of the automotive light 4. To this end, the lenticular body 24 may be made of at least partially transparent or semi-transparent or translucent material, and may also include one or more opaque portions so as to allow at least partial crossing of the light beam produced by the light source 16.

The second perimetral profile 28 is counter-shaped relative to the first perimetral profile 20 so as to be coupled with the latter according to a shaped coupling, in the assembled configuration of the automotive light 4. The assembly of the automotive light 4 includes the step of joining at least partially to each other the respective first and second perimetral profiles 20, 28. For example, the step is provided for of arranging the lenticular body 24 to close the containment housing 12 of the container body 8 so as to join the respective first and second perimetral profiles 20, 28.

The method of manufacturing the automotive light provides for joining the lenticular body and the container body to each other in correspondence of the perimetral profiles 20, 28, via laser welding. The laser welding process may be realized with different techniques (for example: with simultaneous laser welding, almost-simultaneous laser welding, border laser welding, mask laser welding, radial laser welding, globe laser welding, etc.). However, in the description that follows, specific reference will be made to simultaneous laser welding for exemplary purposes and by way of non-limiting example. In particular, at least one laser source 30 is provided which emits a laser beam or a light beam or an electromagnetic radiation having a characteristic emission spectrum (not shown, but generally known in the related art). Here, the term "characteristic emission spectrum" refers to electromagnetic radiation emitted substantially at a certain frequency or having a certain wavelength. In one embodiment, the laser source may include: a $CO_2$ laser, in which the laser beam is produced by a gas mixture of $CO_2$; or a YAG laser, in which the laser beam is produced by a solid state crystal, or a laser diode (LED).

The laser source 30 is associated with an optical fiber 32 inserted in a matrix/guide 33 supports the optical fiber 32 and guides the light beam emitted by the laser source 30 through a distributor 36 of the laser radiation.

Advantageously, the welding takes place after blocking the container body 8 in a respective attachment block 35. During the welding step, the container body 8 acts as an absorbing member in relation to the light beam emitted by the laser source and the lenticular body 24 acts as a transmissive member of the light beam.

With reference to FIGS. 5, 6, and 7, an apparatus for simultaneous laser welding known per se includes an emitter or laser source 30, a bundle of optical fibers 32, and a distributor of the laser radiation 36. The bundle of optical fibers 32 is connected to the laser emitter 30 so as to collect and convey a laser radiation emitted by the laser emitter 30 towards the distributor of the laser radiation 36. The bundle of optical fibers 32 branches off, then, with a plurality of optical fibers 32, each of which terminates with one end, from which a portion of the laser radiation emitted by the laser emitter 30 can be emitted.

The ends of the optical fibers are fixed to the support or matrix 33 which is provided with through holes, each of which is able to house and support one end of an optical fiber.

The distributor 36 is formed of flat mirror-treated walls 40 (for example, two) and is provided with an optical axis X-X. These walls 40 are arranged facing each other, resulting inclined specularly with respect to the optical axis X-X of the distributor so as to define a compartment 42 which starts with an input opening 44 and ends with an output opening 46.

The input opening 44 of the compartment 42 is connected to the support 33 for the optical fibers 32, so that the compartment 42 can receive the laser radiation emerging from the optical fiber 32. The outlet opening 46 of the compartment 42 constitutes an output mouth of the laser radiation distributor 36, from which the laser radiation propagated by multiple reflections inside the compartment 42 to the outside of the distributor of the laser radiation 36 comes out.

Figure 8:
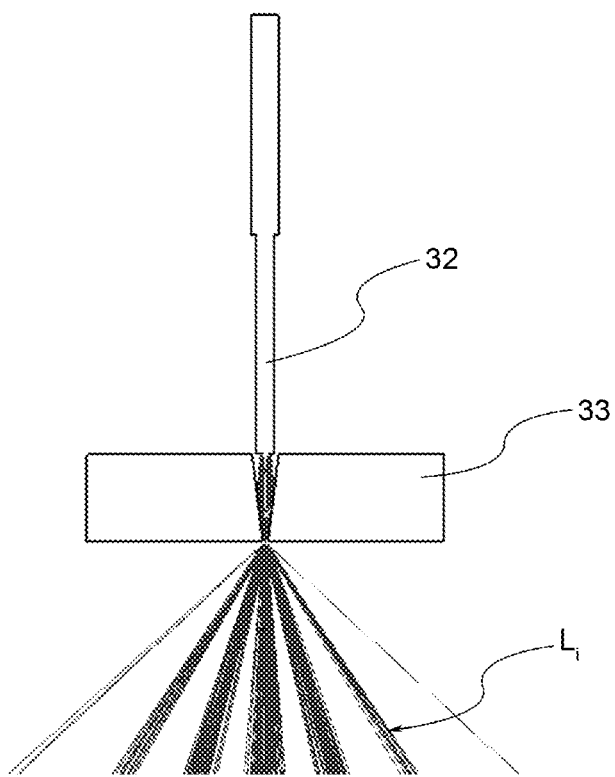
Figure 9:
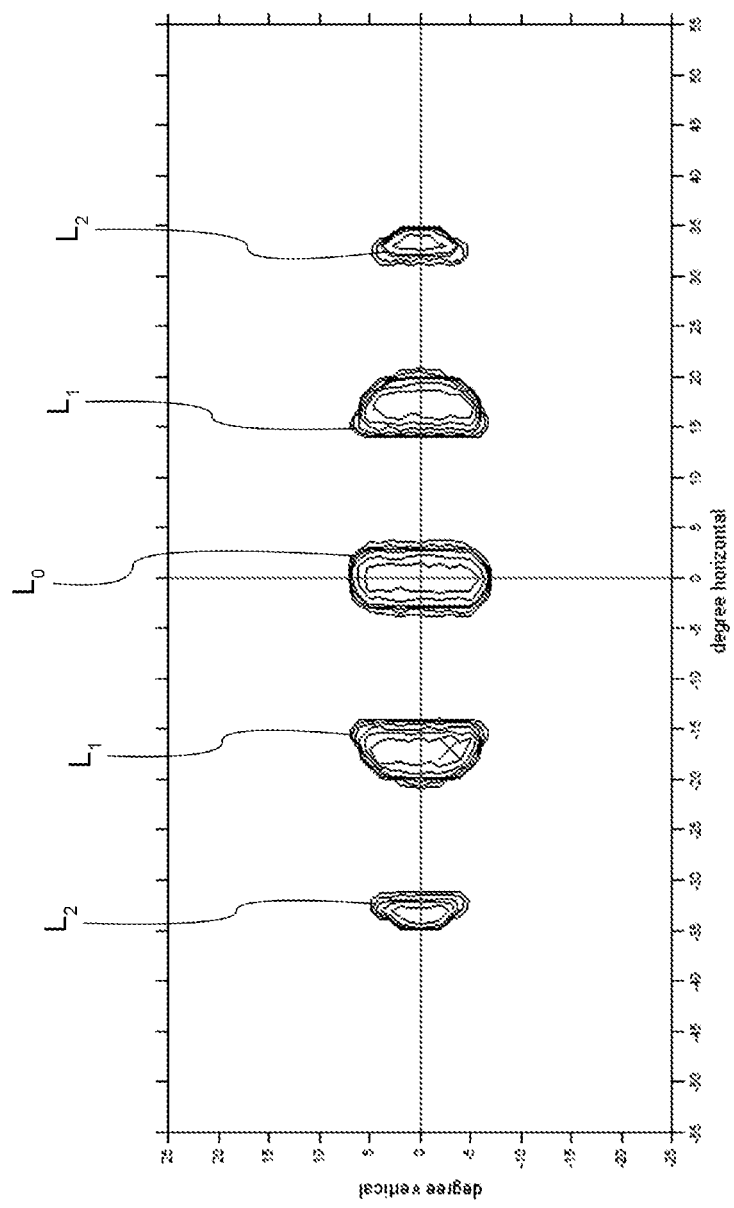
Figure 11:
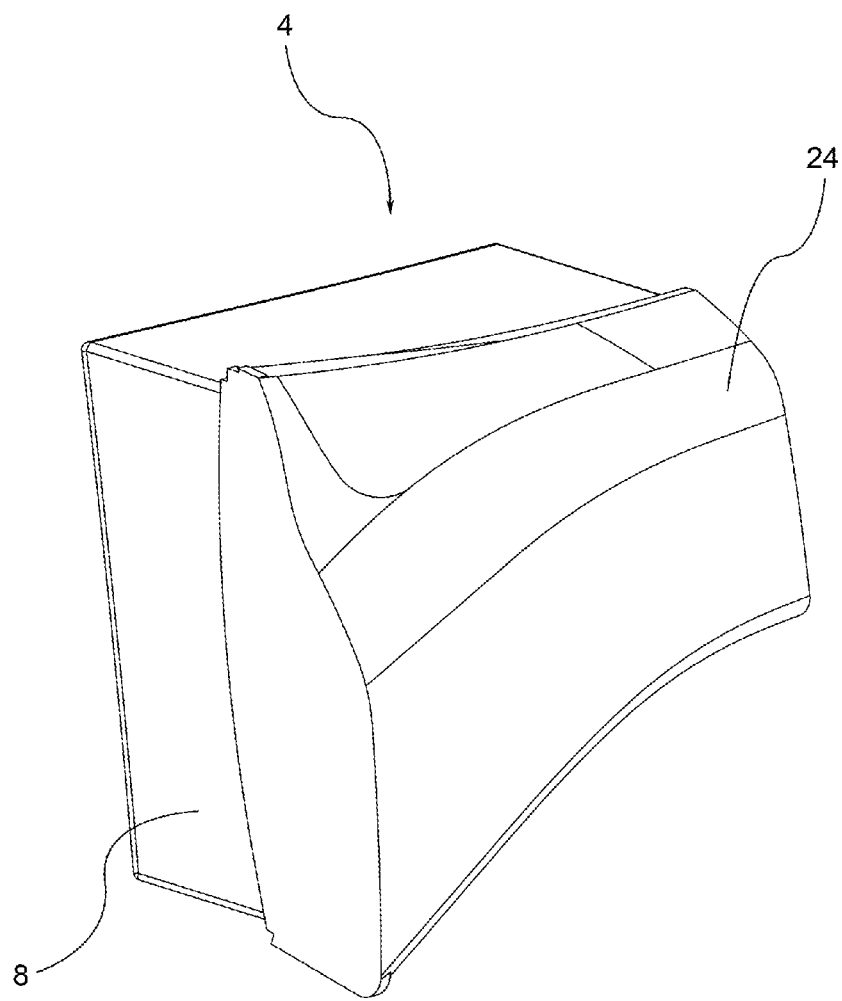
FIG. 11 is a perspective view of an automotive light according to the present invention shown in an assembled configuration.
Figure 12:
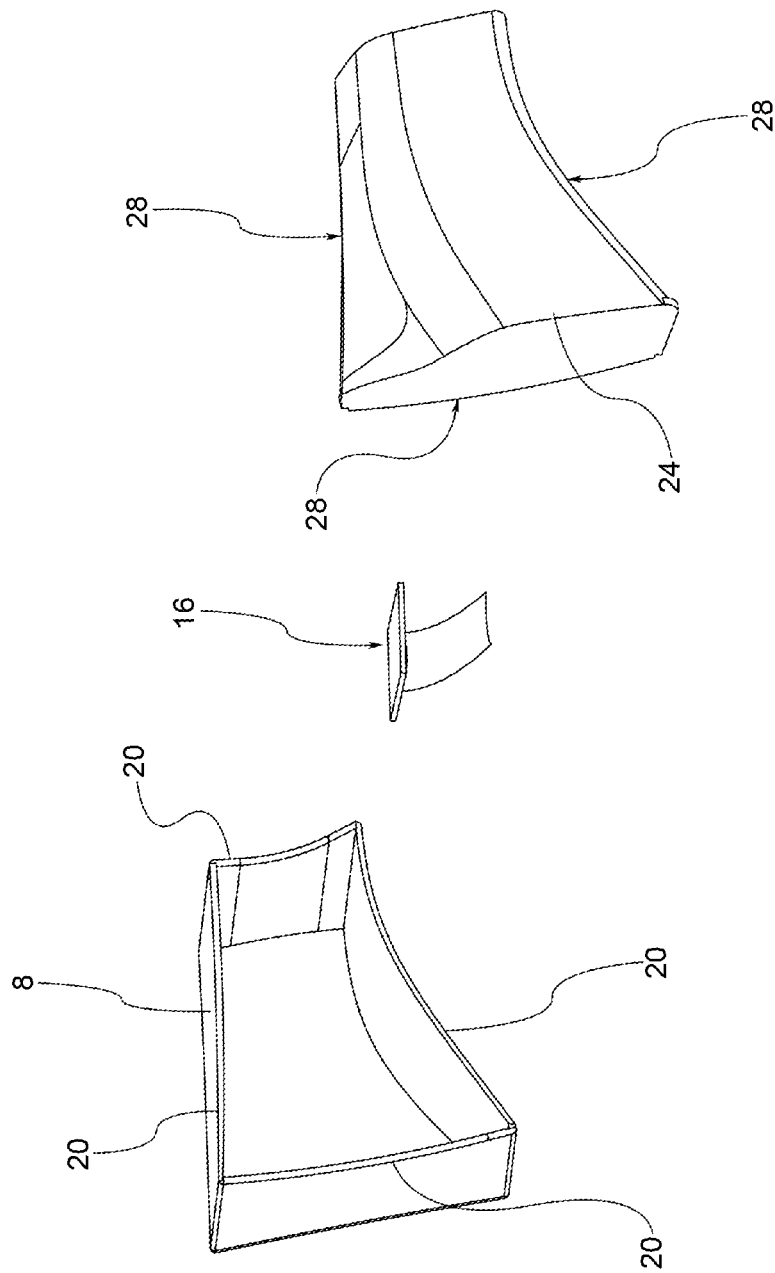
FIG. 12 is an exploded perspective view of parts of the automotive light of FIG. 11.
Figure 13:
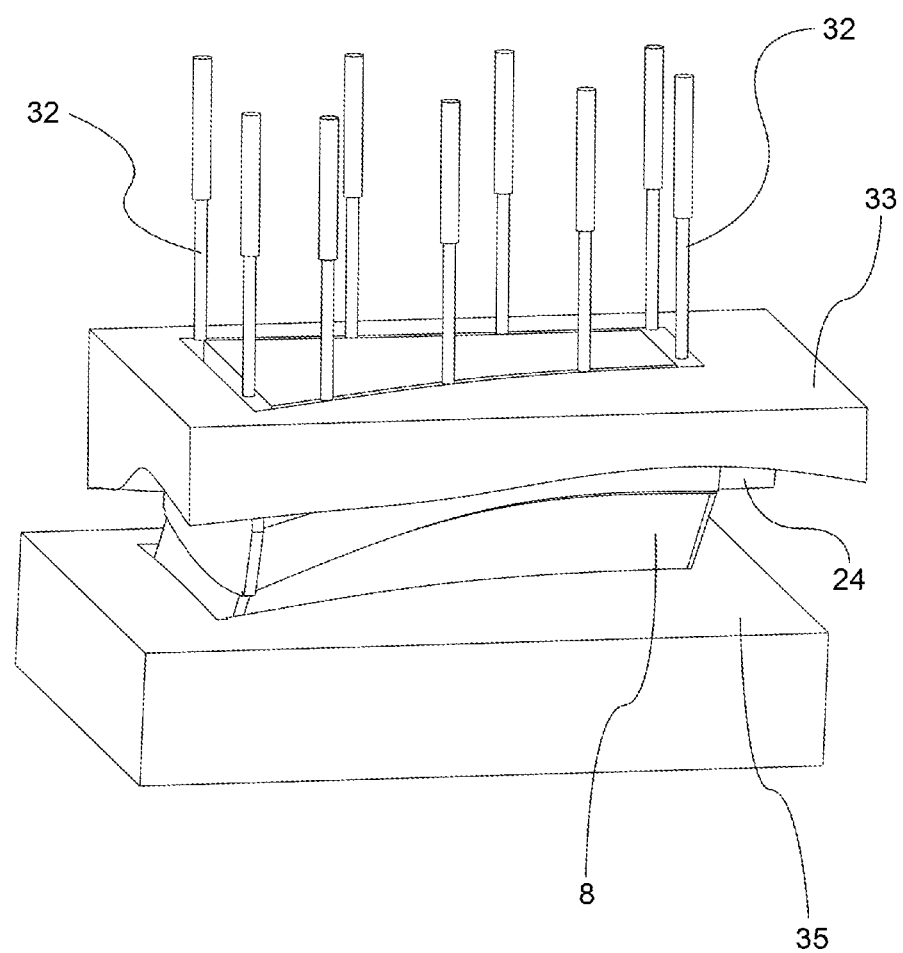
FIG. 13 is a perspective view of the automotive light and equipment for welding the automotive light in an assembled configuration, according to one embodiment of the present invention.
Figure 14:
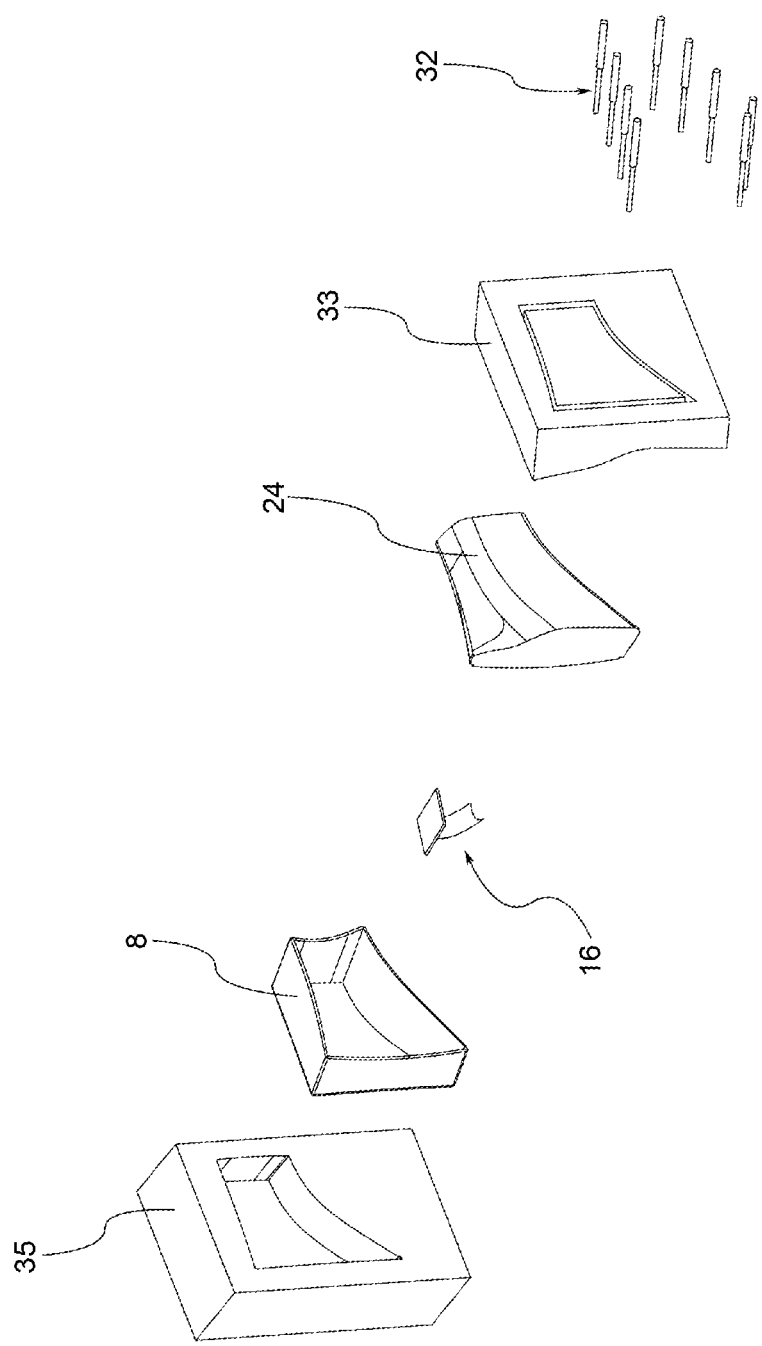
FIG. 14 is an exploded perspective view of parts of the welding equipment of FIG. 13.

In one embodiment, the input opening 44 of the compartment 42 extends with a greater area than that of the output opening 46 of the compartment 42, thus giving the laser radiation distributor 36 a wedge-shaped conformation. This structure of the distributor is responsible for a distribution in portions or lobes Li of the laser radiation at the output 46 of the mouth of the laser radiation distributor 36, as described in the US patent application having the publication number US2006/0219675 and briefly referred to in FIGS. 8 and 9. Here, the term "portion or lobe" is understood to mean a portion of the laser radiation emitted. This publication describes the spatial distribution of the laser radiation referred to. Hereto however it is recalled that the variation of the geometry of the compartment 42 of the distributor 36, particularly of its openings 44, 46, determines the number and size of the lobes Li relative to the distribution of the laser radiation.

Figure 10:
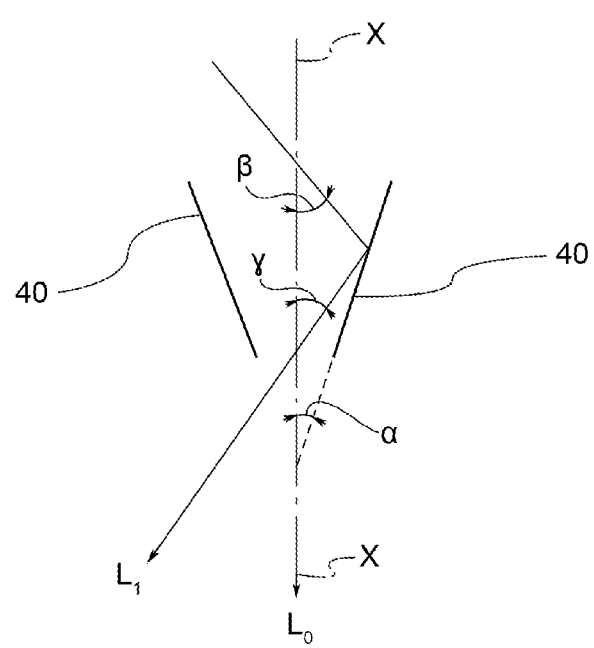

With reference to FIG. 10, it will be appreciated that the zero order lobe L0 is the one having the same direction as the optical axis X-X of the distributor of the laser radiation 36 and is related to a radius of the laser radiation that does not undergo any reflection of the laser radiation inside the distributor 36, while the lobe of order one L1 is the lobe relative to a radius of the laser radiation emerging from the distributor 36 forming an angle $\Psi$ with the optical axis of the distributor 36. This angle $\Psi$ is determined by the relationship: $\Psi = 2\alpha + \beta$ and is relative to a radius of the laser radiation which undergoes a single reflection of the laser radiation inside the distributor 36.

An additional lobe of order two L2 relates to a radius of the laser radiation which is reflected twice inside the distributor of the laser radiation 36 and forms with the optical axis X-X of the distributor of the laser radiation 36 an angle greater than that relative to the lobe of order one L1.

The equipment for simultaneous laser welding described above is used to weld elements particularly of an automotive light 4 such as a lenticular body 24 and a container body 8, to which explicit reference will be made without loss of generality, wherein the lenticular body 24 acts as a transmissive polymeric body and the container body 8 acts as an absorbent polymeric body. The lenticular bodies 24 and the container 8 of the automotive light 4 are made, for example, of polymethylmethacrylate, polycarbonate, ABS, etc., and extend with a complex geometry. In particular, the lenticular body 24 may have surface discontinuities. The lenticular body 24, during the welding phase, is directly facing the output opening 46 of the distributor of laser radiation 36.

The welding method of the present invention will now be described in detail.

In particular, the container body 8 delimited by the first perimeter profile 20 is prepared, the lenticular body 24 delimited by a second perimetral profile 28 is prepared, associating at least partially with each other the respective first and second perimetral profiles 20, 28 of the container body 8 and of the lenticular body 24, so that the contact surface between the perimetral profiles defines a welding interface 48.

At least one laser emission device 30 (for example, a light emitting diode or LED) emitting a light beam or radiation having a characteristic emission spectrum is further provided. The emission device 30 is operatively connected to a first light guide 52 or distributor device of the emitted light radiation, the first light guide includes an input 56 and an output 60 of the light radiation, so as to distribute the radiation from the output 60 according to a spatial distribution including a plurality of portions or lobes Li. For example, the first light guide 52 may be connected to the support 33 for the optical fibers 32.

Advantageously, the method of the present invention further includes the step of providing a second light guide 64 or light guide portion inside the lenticular body 24 adapted to obtain a light guide of the light radiation which propagates itself inside the lenticular body 24. The second light guide 64 of the lenticular body 24 is provided with walls able to satisfy the overall internal reflection condition for at least one portion of the laser radiation defined by the at least one first lobe Li.

Advantageously, the first and the second light guides 52, 64 are suitably arranged with each other so as to route at least the first lobe or portion Li of the laser radiation coming from the output 60 of the first light guide 52 towards the second light guide 64 of the lenticular body 24, so as to propagate the at least one portion of the laser radiation inside the second light guide 64 towards the welding interface 48.

The container body 8 acts as an absorbing member in relation to the light beam and the lenticular body 24 acts as a transmissive member of the light beam. This way, the light beam reaching the welding interface 48 is able to soften and weld together the perimetral profiles 20, 28 respectively of the container body 8 and of the lenticular body 24.

In one embodiment, the method includes the step of routing at least one further portion or second lobe L2 of the laser radiation coming from the output 60 of the first light guide 52, towards the second light guide 64 of the lenticular body 24, so as to follow an alternative path as compared to the first portion of the laser radiation relating to the first lobe Li, wherein the second lobe L2 impacts on the welding surface 48.

In one embodiment, the light beam distributed at the output 60 of the first light guide 52 includes a plurality of lobes Li, routed towards the second light guide 64 of the lenticular body 24, the lobes having an 'n' level, where 'n' is number of reflections affecting the lobe by passing through the second light guide 64 of the lenticular body 24 before impacting on the welding surface 48.

In one embodiment, the method includes the step of manufacturing at least one lobe '0' which impacts on the welding surface 48 passing through the lenticular body 24 without undergoing reflections inside the second light guide 64.

In one embodiment, the method includes the step of manufacturing at least two lobes Li of different levels, which impact on the weld interface 48 passing through the lenticular body 24 undergoing a different number of reflections inside the second light guide 64.

In one embodiment, the first light guide 52 and the second light guide 64 of the lenticular body 24 are aligned in the same direction.

In one embodiment, the first light guide 52 and the second light guide 64 of the lenticular body 24 are oriented so as to be inclined with each other according to a first and a second direction X-X, Y-Y, in order to bypass surface discontinuities of the lenticular body 24.

Figure 15:
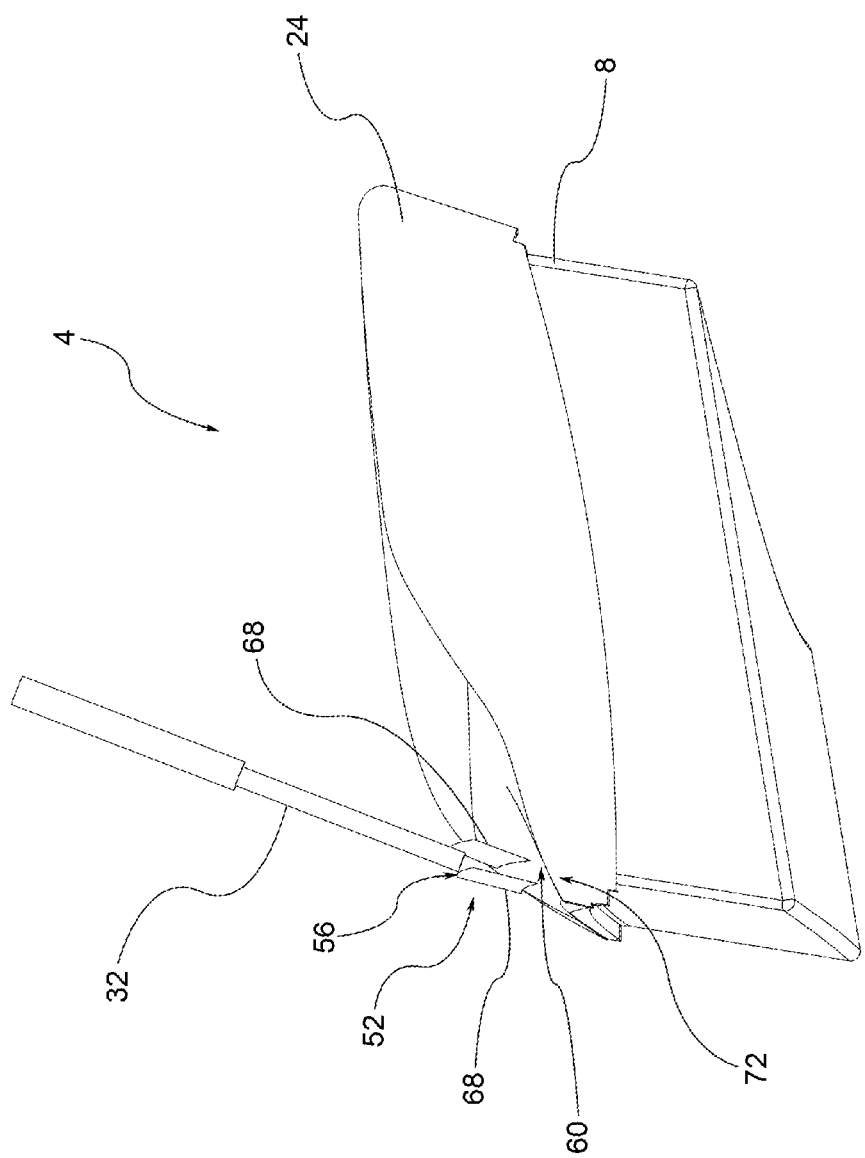
FIG. 15 is a partially sectioned perspective view of welding equipment according to one embodiment of the present invention, with some details omitted for clarity.
Figure 16:
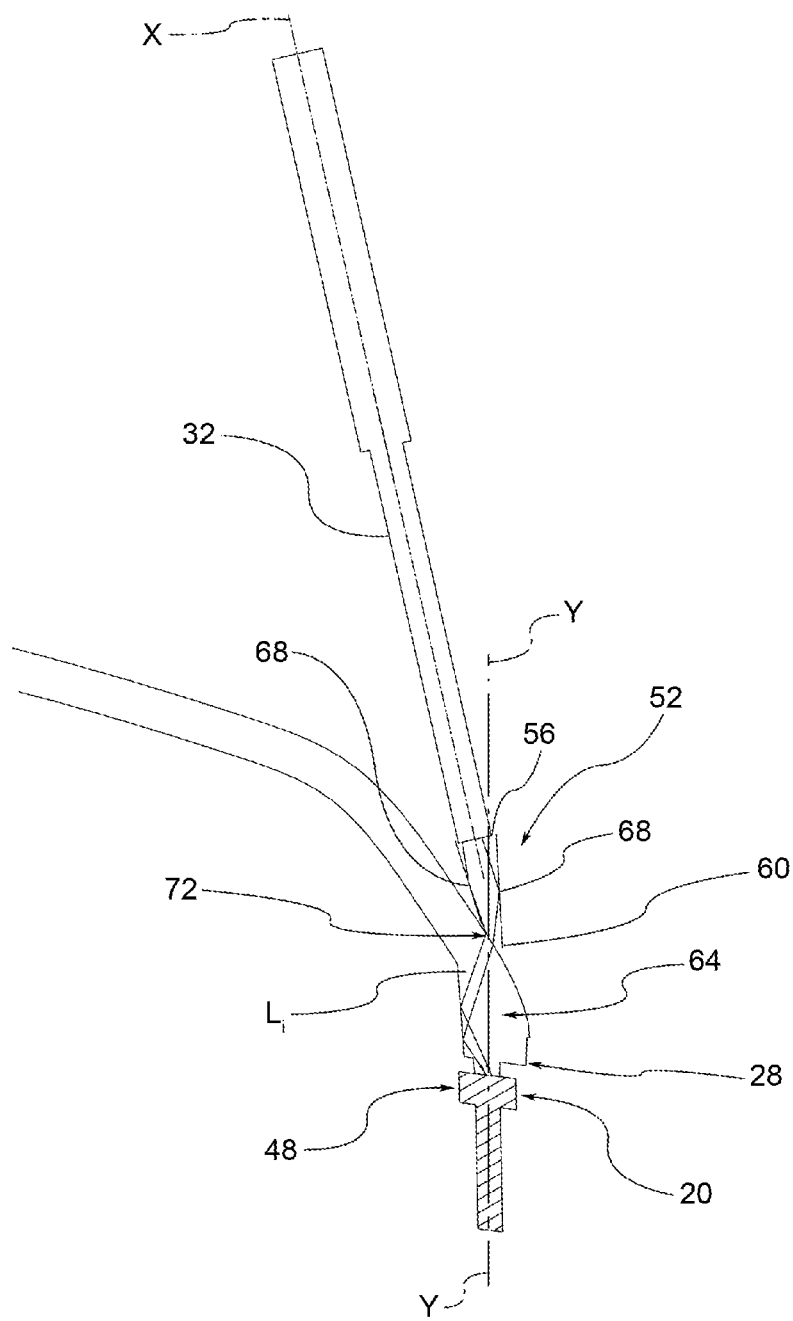
FIG. 16 is a partial cross-sectional view of the equipment of FIG. 15.

The first light guide 52 according to the present invention may be realized in a number of different ways. For example, the first light guide 52 may include at least a pair of walls 68 facing each other and mirror-wise inclined relative to an optical axis X-X of the first light guide 52, so as to define a compartment 42 starting with the input 56 and ending with the output 60 for the propagation of the light beam in lobes Li. For example, the compartment 42 may be hollow and the walls 68 may be reflective of the light beam incident on them (see FIGS. 15-16).

Figure 17:
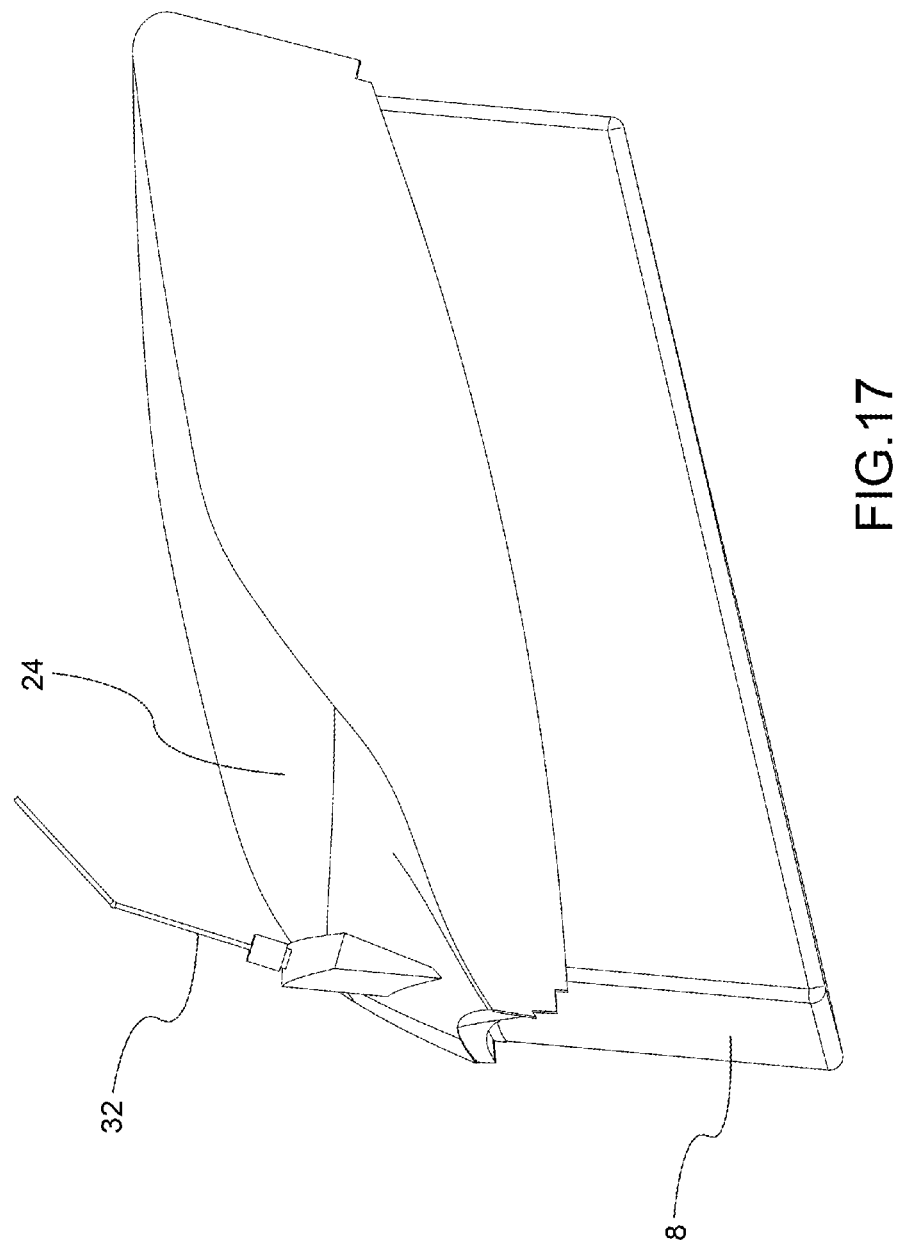
FIG. 17 is a partially sectioned perspective view of welding equipment according to another embodiment of the present invention, with some details omitted for clarity.
Figure 18:
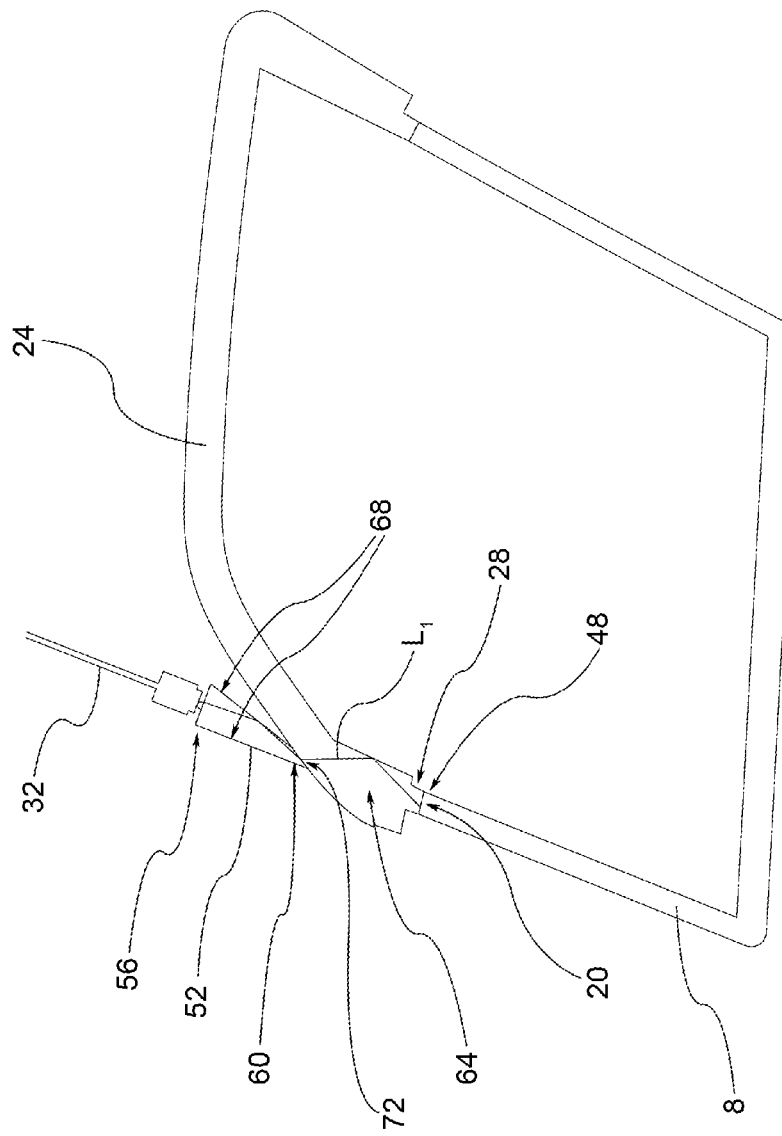
FIG. 18 is a partial cross-sectional view of the equipment of FIG. 17.

In one embodiment, the first light guide 52 includes a solid body suitable to satisfy the overall internal reflection condition for the at least one portion or lobe Li of the laser radiation, the solid body 56 extending from the input to the output 60 (see FIGS. 17-18). For example, the first light guide 52 is shaped and placed so as to arrange the output 60 in the proximity of and/or substantially in contact with the lenticular body 24.

In one embodiment, the output 60 is at least partially counter-shaped relative to the corresponding portion of the lenticular body 24 which it is arranged in proximity and/or substantially in contact with.

A possible method for defining the mutual orientation between the first and the second light guide 52, 64 will now be described.

In particular, the mutual orientation between the first light guide 52 and the second light guide 64 of the lenticular body 24 is determined by following backwards the path of a beam of laser radiation belonging to a determined lobe Li of the spatial distribution intended for propagation inside the second light guide 64 of the lenticular body 24. For example, this mutual orientation may be obtained starting from the welding interface 48, according to the steps of: back-tracing the path of the beam of laser radiation of the lobe Li of the spatial distribution intended to be propagated until finding a first wall of the second light guide 64, wherein the condition of overall internal reflection of the beam of laser radiation itself may be met; and determining the beam reflected by the wall found meeting the overall internal reflection, until meeting an input area 72 of the laser radiation, which extends on a first face of the lenticular body 64 directly facing the associable first light guide 52.

This back-tracing procedure can be reiterated to identify possible additional walls of the second light guide 64, separate from the first wall. Moreover, in one embodiment, the back-tracing procedure includes the step of back-calculating the refraction the beam of laser radiation undergoes when the material from which the lenticular body 64 is made passes through air, so as to identify the direction of the beam of laser radiation coming from the output 60 of the first light guide 52 of the laser radiation. Such direction determines the positioning of the first light guide 52 with regard to the lenticular body 24, for example, placing the axis of the first light guide 52 of the laser radiation with a same direction as that of the beam of laser radiation back-calculated at the output of the second light guide 64. The calculation of the mutual orientation may also provide for the step of estimating a possible deviation affecting the beam of laser radiation due to any surface discontinuity of the lenticular body 24, and/or the step of estimating the overriding of such a discontinuity, again for determining the exact direction of the beam of laser radiation.

As described above, the laser welding step may be performed by one or more optical fibers 32 which simultaneously emit respective light radiation on separate, predetermined portions of the perimetral profiles 20, 28, according to a 'simultaneous' welding technique. It is also possible to weld the automotive light 4 using at least one mobile laser source which is guided so as to direct the light radiation along the perimetral profiles 20, 28, according to a 'contour' welding technique. In addition, as noted above, the laser welding process may be realized with different techniques such as for example with simultaneous laser welding, almost-simultaneous laser welding, border laser welding, mask laser welding, radial laser welding, globe laser welding.

It will be appreciated that the manufacturing method of the invention makes it possible to overcome the disadvantages of the prior art. Specifically, because of the method of the present invention, it is possible to apply the technique of laser welding to automotive lights having any type of complex geometry, such as geometry having curvatures and thicknesses highly variable along the perimeter of the light.

The laser welding technique of the present invention is more convenient than alternative welding techniques of the prior art in the field of automotive lights, and affords advantages both in terms of cost and time for the same quality of the welding joint. In particular, there is a reduction of consumption and therefore of costs since a greater part of the light beam can be transmitted to the welding interface between the lenticular body and the container body. The light beam on the interface portion of welding between the lenticular body and the container body is thus suitable to obtain a welded joint having excellent mechanical qualities, without waste of luminous power. Further, irrespective of the technique used to perform the laser welding step (for example, the contour or 'simultaneous' type), the laser welding step is quick and reliable, allowing a further reduction of assembly costs for the same quality of the joint compared to the prior art.

Experimental tests have shown that the efficiency of the laser welding system using the method of the invention is improved compared to the prior art, in the case of a lenticular body which extends convexly. In fact, with reference to the same example mentioned above in relation to the prior art, a fraction of 31% of the radiation emerging from the output of the light guide of the laser radiation distributor is able to reach the welding area. Moreover, by providing a light guide portion which cooperates with the light guide of the distributor of the laser radiation it is possible to control more efficiently the laser radiation intended for the welding area with respect to the teaching of the prior art, especially in the laser welding of lenticular bodies having surface discontinuities. In the present case, at least one lobe of the laser radiation distribution at the output of the mouth of the laser radiation distributor may be able to bypass a possible surface discontinuity of the lenticular body, since it can reach its destination conveyed in the light guide portion of the lenticular body.

An automotive light according to the present invention includes a container body closed by a lenticular body so as to form a housing chamber housing a light source adapted to emit light when supplied with electrical energy. The lenticular and container bodies are of polymeric nature. The lenticular body extends with a complex geometry including a portion adapted to act as a light guide for a light radiation, in particular laser. Such an automotive headlight is made by the method described above.

It will be appreciated that the present invention is susceptible to numerous embodiments or variants without departing from the scope of the present invention. For example, the laser welding procedure may be implemented with a different technique (for example, with border laser welding). In this case, the distributor of the laser radiation may be replaced with a light guide made of polymeric material (such as polymethylmethacrylate, polycarbonate, ABS, etc.) able to receive and propagate within it a laser radiation emitted by a laser emitter. Such light guide has a wedge-shape so as to impart to the laser radiation in output therefrom a distribution in lobes, wherein at least one of them is intended to penetrate and be propagated inside a light guide portion of the lenticular body to reach the welding area.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method of manufacturing an automotive light comprising the steps of:
   providing a container body delimited by a first perimetral profile;
   providing a lenticular body delimited by a second perimetral profile;
   associating at least partially with each other the respective first and second perimetral profiles of the container body and the lenticular body, a contact surface between the perimetral profiles defining a welding interface;
   providing at least one laser emission device emitting a light beam or radiation having a characteristic emission spectrum,
   wherein the emission device is operatively connected to a first light guide of the emitted light radiation, the first light guide including an input and an output of the light radiation, so as to distribute radiation from the output according to a spatial distribution including a plurality of portions or lobes;

providing a second light guide inside the lenticular body adapted to obtain a light guide of the light radiation inside the lenticular body, wherein the second light guide is provided with walls capable of satisfying an overall internal reflection condition for at least one portion of the laser radiation defined by at least one first lobe or portion;

suitably arranging with each other the first and the second light guide so as to route at least a first lobe or portion of the laser radiation coming from the output of the first light guide towards the second light guide of the lenticular body, so as to propagate at least one portion or lobe of the laser radiation inside the second light guide towards the welding interface, wherein the container body acts as an absorbing member in relation to the light beam and the lenticular body acts as a transmissive member of the light beam.

2. The method as set forth in claim 1, including the step of routing at least one further portion or second lobe of the laser radiation coming from the output of the first light guide, towards the second light guide of the lenticular body, so as to follow an alternative path as compared to the first portion of the laser radiation relating to the first lobe, wherein the second lobe impacts on the welding surface.

3. The method as set forth in claim 1, wherein the light beam distributed at the output of the first light guide includes a plurality of lobes, routed towards the second light guide of the lenticular body, the lobes having an 'n' level, where 'n' is number of reflections affecting the lobe by passing through the second light guide of the lenticular body before impacting on the welding surface.

4. The method as set forth in claim 1, including the step of manufacturing at least one lobe having a '0' level which impacts on the welding surface by passing through the lenticular body without undergoing reflections inside the second light guide.

5. The method as set forth in claim 3, including the step of manufacturing at least two lobes having different levels, which impact on the welding surface by passing through the lenticular body undergoing a different number of reflections inside the second light guide.

6. The method as set forth in claim 1, wherein the first light guide and the second light guide are aligned along an identical direction.

7. The method as set forth in claim 1, wherein the first light guide and the second light guide of the lenticular body are oriented so as to be inclined relative to each other according to a first and a second direction.

8. The method as set forth in claim 1, wherein the laser emission device is connected to the first light guide via an optical fiber beam, the optical fibers being secured to a support or matrix.

9. The method as set forth in claim 1, wherein the first light guide includes at least a pair of walls facing each other and minor-wise inclined relative to an optical axis of the first light guide, so as to define a compartment starting with the input and ending with the output for the propagation of the light beam in lobes.

10. The method as set forth in claim 9, wherein the compartment is hollow and the walls are reflecting relative to the light beam that impacts on them.

11. The method as set forth in claim 1, wherein the first light guide has a solid body adapted to meet the condition of overall internal reflection for the at least one portion of the laser radiation, with the solid body extending from the input to the output.

12. The method as set forth in claim 1, wherein the first light guide is shaped and placed so as to arrange an output in the proximity of and/or substantially contacting the lenticular body.

13. The method as set forth in claim 1, wherein the output is at least partially counter-shaped relative to the corresponding portion of the lenticular body to which it is arranged in the proximity and/or substantially in contact.

14. The method as set forth in claim 1, wherein mutual orientation between the first light guide of the laser radiation and the second light guide of the lenticular body is determined by following backwards a path of a beam of laser radiation belonging to a determined lobe of the spatial distribution intended for propagation inside the second light guide of the lenticular body.

15. The method as set forth in claim 14, wherein the mutual orientation is obtained starting from the welding interface, according to the steps of:

back-tracing the path of the beam of laser radiation of the lobe of the spatial distribution intended to be propagated until finding a first wall of the second light guide, wherein the condition of overall internal reflection of the beam of laser radiation itself may be met;

determining the beam reflected by the wall found meeting the overall internal reflection, until meeting an input area of the laser radiation, which extends on a first face of the lenticular body directly facing the associable first light guide.

16. The method as set forth in claim 15, wherein the process is repeated to identify any further walls of the second light guide, different from the first wall.

17. The method as set forth in claim 14, including the steps of:

back-calculating refraction the beam of laser radiation undergoes when material from which the lenticular body is made passes through air, so as to identify the direction of the beam of laser radiation coming from the output of the first light guide;

wherein such direction determines the positioning of the first light guide with regard to lenticular body, placing the axis of the first light guide with a same direction as that of the beam of laser radiation back-calculated at the output of the second light guide.

18. The method as set forth in claim 14, wherein the calculation of the mutual orientation provides for the step of estimating a possible deviation affecting the beam of laser radiation due to any surface discontinuity of the lenticular body, and/or the step of estimating the overriding of such a discontinuity, for determining the exact direction of the beam of laser radiation.

19. The method as set forth in claim 1, wherein the container body delimits a containment housing which houses at least one light source, electrically connected to a source of electric power, and adapted to emit a light beam to propagate outside the automotive light;

and wherein the lenticular body is adapted to close the containment housing and is adapted to receive the light beam generated from the light source and to propagate it outside the light.

20. The method as set forth in claim 1, wherein the laser welding step takes place via a simultaneous welding technique with one or more optical fibers that emit respective light radiations simultaneously on different predetermined portions of the perimetral profiles.

21. The method as set forth in claim 1, wherein the laser welding step takes place via a border welding technique with at least one moving laser source guided so as to route the light radiation along the perimetral profiles.

22. An automotive light manufactured via the method as set forth in claim 1.

* * * * *